(12) United States Patent
Hsieh et al.

(10) Patent No.: US 12,284,004 B1
(45) Date of Patent: Apr. 22, 2025

(54) DISPLAYS WITH DYNAMIC LIQUID CRYSTAL ANTENNAS

(71) Applicant: HEWLETT-PACKARD DEVELOPMENT COMPANY, L.P., Spring, TX (US)

(72) Inventors: Hsing-Hung Hsieh, Taipei (TW); Isaac Lagnado, Spring, TX (US); Super Liao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 267 days.

(21) Appl. No.: 17/977,379

(22) Filed: Oct. 31, 2022

(51) Int. Cl.
*H04B 7/04* (2017.01)
*G02F 1/1333* (2006.01)
*H01Q 1/12* (2006.01)
*H01Q 1/22* (2006.01)
*H01Q 1/52* (2006.01)
*H01Q 3/24* (2006.01)

(52) U.S. Cl.
CPC ......... *H04B 7/04* (2013.01); *G02F 1/133331* (2021.01); *H01Q 1/1271* (2013.01); *H01Q 1/2266* (2013.01); *H01Q 1/526* (2013.01); *H01Q 3/24* (2013.01)

(58) Field of Classification Search
CPC ...... H01Q 1/1271; H01Q 1/22; H01Q 1/2258; H01Q 1/2266; H01Q 1/52; H01Q 1/526; H01Q 3/24; G02F 1/133331; G02F 1/133334; G02F 1/1343; G06F 1/16; G06F 1/1601; G06F 1/1605; G06F 1/1607; H04B 7/04
See application file for complete search history.

(56) References Cited

U.S. PATENT DOCUMENTS

2020/0135140 A1\* 4/2020 Binboga ................. G06F 3/147
2021/0111477 A1\* 4/2021 Foo .......................... H01Q 1/44

\* cited by examiner

*Primary Examiner* — Robert Karacsony
(74) *Attorney, Agent, or Firm* — Knobbe, Martens, Olson & Bear, LLP

(57) ABSTRACT

An example display for a computing device includes: a display layer; a dynamic liquid crystal antenna formed substantially parallel to the display layer, the dynamic liquid crystal antenna comprising: a liquid crystal layer; a pixelated driving electrode to selectively activate pixels of the liquid crystal layer to form an antenna structure; and a common electrode extending between the liquid crystal layer and the display layer to isolate the liquid crystal layer from the display layer.

10 Claims, 8 Drawing Sheets

DISPLAYS WITH DYNAMIC LIQUID CRYSTAL ANTENNAS

BACKGROUND

Computing devices, such as mobile computing devices, may include communications interfaces and components to enable wireless communications. Computing devices capable of multiple wireless communications protocols may employ separate interfaces for each protocol.

DETAILED DESCRIPTION

Computing devices which are enabled for multiple wireless communication protocols may include separate components for each wireless communication protocol. In particular, the computing device may include a separate antenna for each wireless communications protocol, since the wireless components may use antenna structures having different shapes for the different protocols. The antennas may therefore take up additional space in the computing device. In particular, the antennas may often be included in the bezel around the display of the computing device so as not to interfere with the display.

As presently described, an example display, such as a liquid crystal display, includes an additional layer parallel to the display, forming a dynamic liquid crystal antenna. The dynamic liquid crystal antenna includes a liquid crystal layer and a pixelated driving electrode to selectively activate pixels of the liquid crystal layer. The driven pixels of the liquid crystal layer form an antenna structure for use in wireless communications. The dynamic liquid crystal antenna further includes a common electrode extending between the liquid crystal layer and the display layer to isolate the electromagnetic waves from the driving electrode and prevent them from affecting the display layer.

The dynamic liquid crystal antenna can therefore be used to form suitable antenna structures for a variety of different wireless components and protocols without separate antennas for each protocol. In particular, portions of the dynamic liquid crystal antenna may be allocated to different active wireless components. Suitable antenna structures for the given active wireless component can then be dynamically formed in the allocated portion.

Figure 1A:
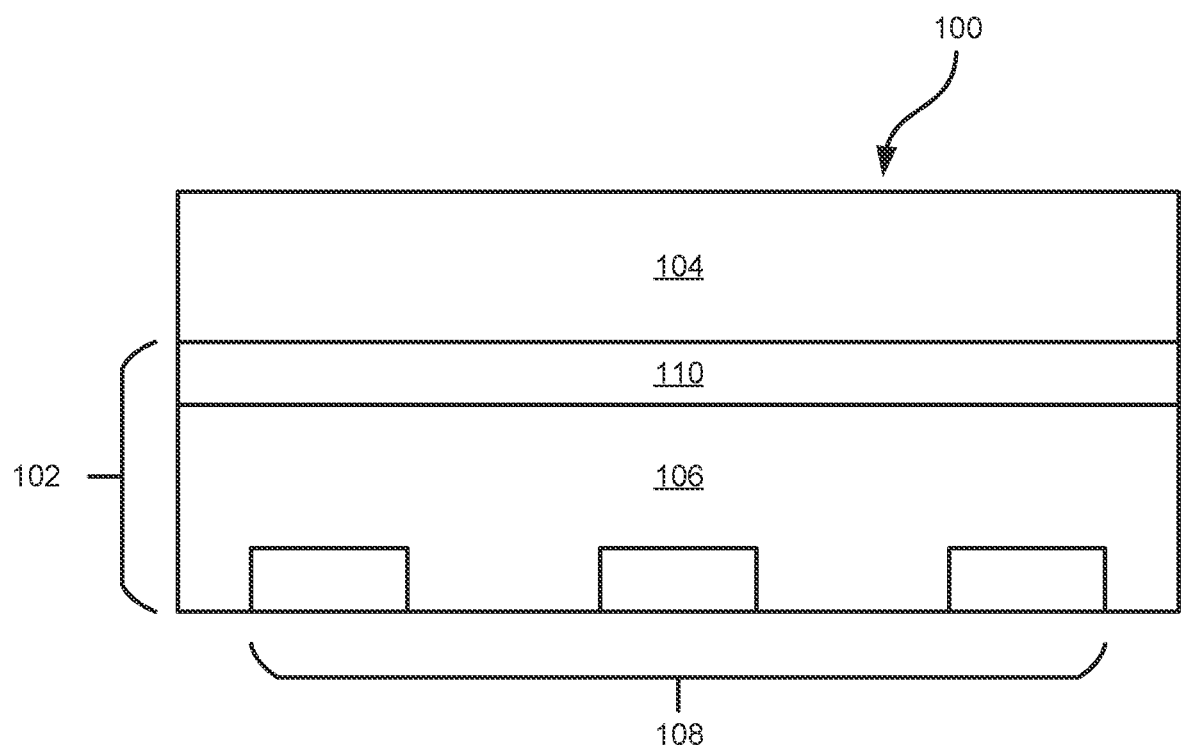
FIG. 1A is a schematic diagram of a side view of an example display with a dynamic liquid crystal antenna.

FIG. 1A shows a schematic diagram of a side view of an example display 100 with an integrated dynamic liquid crystal antenna 102. The display 100 may be for a computing device, such as a laptop computer, a notebook computer, an all-in-one computer, a mobile phone, or the like. In particular, the display 100 may be for computing devices which also provide wireless communications capabilities and use antennas.

The display 100 includes a display layer 104 to display data, for example in the form of visual features such as graphics, text, and the like. The display layer 104 may be, for example, a liquid crystal display (LCD), light-emitting diode (LED), organic light-emitting diode (OLED), or the like.

The display 100 further includes the dynamic liquid crystal antenna 102 (also referred to herein as simply the antenna 102 or the dynamic antenna 102). The antenna 102 is formed substantially parallel to the display layer 104 and includes a liquid crystal layer 106, a driving electrode 108, and a common electrode 110.

The liquid crystal layer 106 is disposed between the driving electrode 108 and the common electrode 110 and is activatable by the driving electrode to form an antenna structure capable of acting as an antenna for wireless communications.

The driving electrode 108 is pixelated to selectively activate pixels of the liquid crystal layer 106 to dynamically form the antenna structure. That is, the driving electrode 108 may be controlled to activate different pixels of the liquid crystal layer 106 to form different antenna structures based on the type of wireless communications.

Figure 1B:
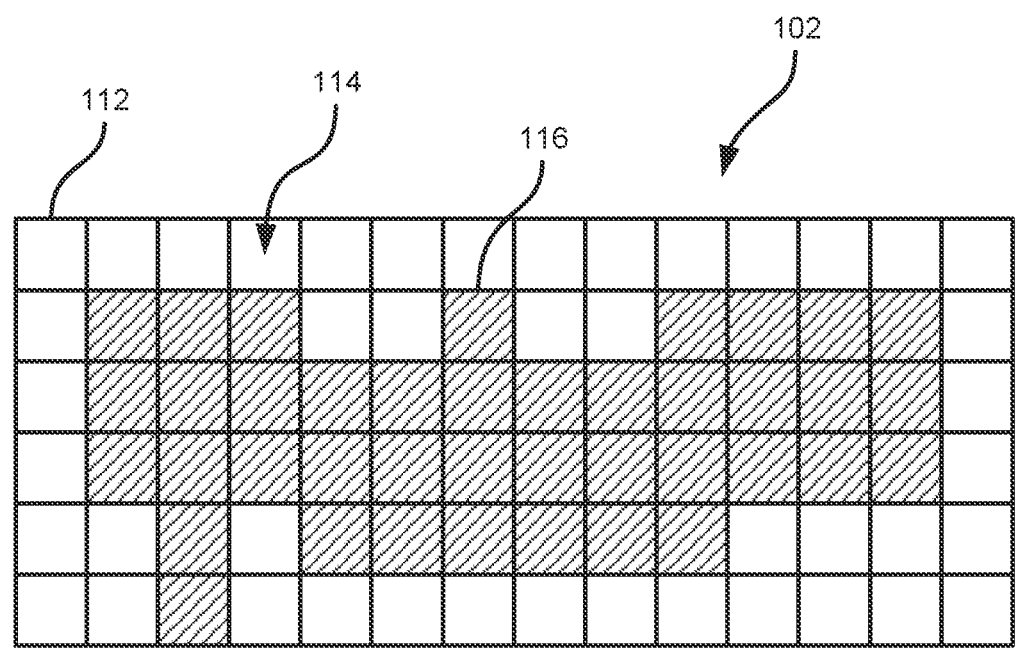
FIG. 1B is a schematic diagram of the example dynamic antenna of FIG. 1A selectively activated to form an antenna structure.

For example, referring to FIG. 1B, the driving electrode 108 may include pixel electrodes which may act as anodes for the dynamic antenna 102 and may be formed of suitable conductive materials, including metals, transparent conductors, combinations of the above, and the like. Each pixel electrode may be selectively driven to activate the liquid crystal layer 106 locally about the pixel electrode. Thus, the local area of the liquid crystal layer 106 about each pixel electrode may form a pixel 112. Further, as illustrated in FIG. 1B, the pixel electrodes may be driven to activate the pixels 112 to form an antenna structure 114 from activated pixels 116.

The common electrode 110 extends between the liquid crystal layer 106 and the display layer 104. The common electrode 110 may act as a cathode for the dynamic antenna 102 and may be formed of suitable conductive materials, including metals, transparent conductors, combinations of the above, and the like. The common electrode 110 may act as a common cathode for each of the pixel electrodes 112 and hence may not have any breaks or gaps. The common electrode 110 therefore shields electromagnetic radiation from the driving electrode 108 from reaching the display layer 104. That is, the common electrode 110 isolates the liquid crystal layer 106 from the display layer 104. The display layer 104 may therefore maintain its display functionality without being affected by the dynamic antenna 102.

In operation, a display controller (not shown) may control the display layer 104 to display data, as received, for example from a processor of a computing device in which the display 100 is employed. An antenna controller (not shown) may also control the dynamic antenna 102, in particular by selectively driving the pixelated driving electrode 108 to drive pixels of the liquid crystal layer 106 to form an antenna structure to enable wireless communications at the computing device. In particular, the dynamic antenna 102 and the display layer 104 may be substantially parallel and integrated to form the display 100 to reduce space used by antennas in the computing device. Further, the antenna 102 allows for a dynamic antenna structure to be formed according to specifications of the wireless components employed by the computing device.

Since the display layer 104 and the liquid crystal layer 106 may be formed of liquid crystal, the display layer 104 and the antenna 102 may each be enclosed by a suitable substrate. For example, referring to FIG. 2A, an example display 200 is depicted. The display 200 includes the display layer 104 and the antenna 102, as well as an outer glass substrate 202, an inner glass substrate 204, and a middle glass substrate 206.

The outer glass substrate 202 is disposed at an outer side of the display 200, and more particularly of the display layer 104. In particular, the display layer 104 may be the layer of the display 200 disposed closest to the viewer, and hence the outer side of the display 200 may be the side of the display 200 closest to a viewer of the display 200. The outer glass substrate 202 may therefore be to enclose the display layer 104 at the outer side of the display 200.

The inner glass substrate 204 is disposed at an inner side of the display 200, and more particularly of the antenna 102. In particular, since the display layer 104 may be closest to the viewer, the antenna 102 may be further from the viewer, and hence the inner side of the display 200 may be the side of the display furthest from the viewer of the display 200. The inner glass substrate 204 may therefore be to enclose the antenna 102 at the inner side of the display 200.

The middle glass substrate 206 is disposed between the display layer 104 and the antenna 102. That is, in example display 200, the display layer 104 and the antenna 102 share the middle glass substrate 206. The middle glass substrate 206 therefore encloses both the display layer 104 and the antenna 102. The middle glass substrate 206 also separates the display layer 104 and the antenna 102 from one another.

Figure 2A:
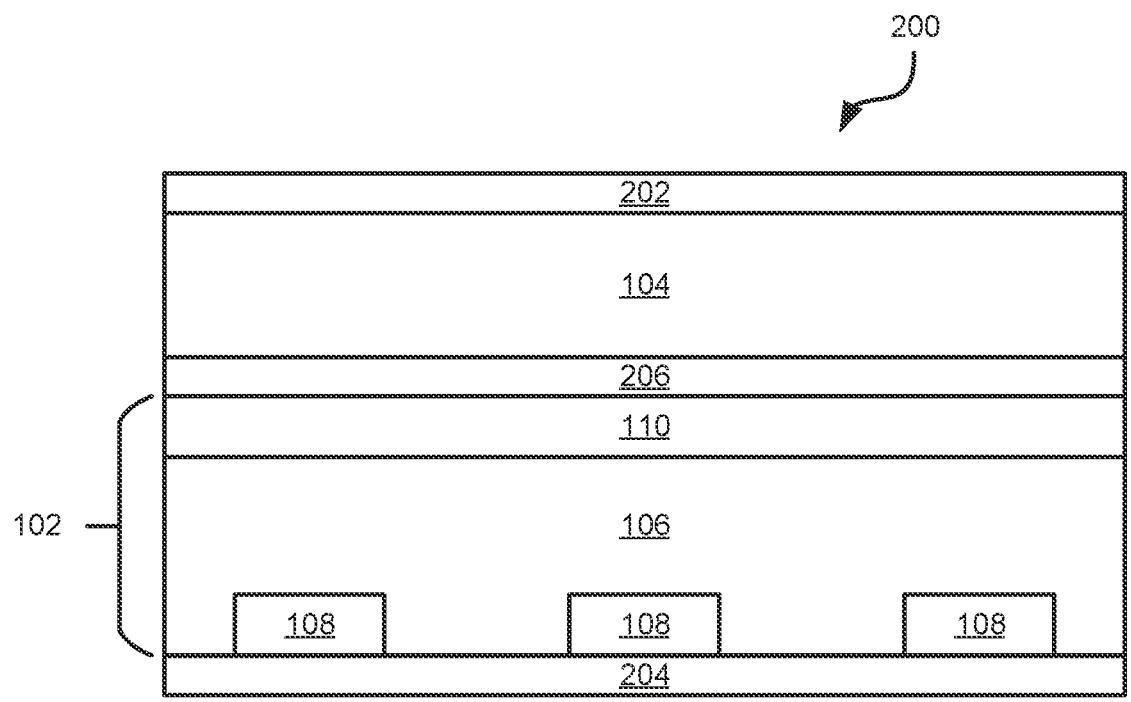
FIG. 2A is a schematic diagram of an example display with substrates enclosing the display.
Figure 2B:
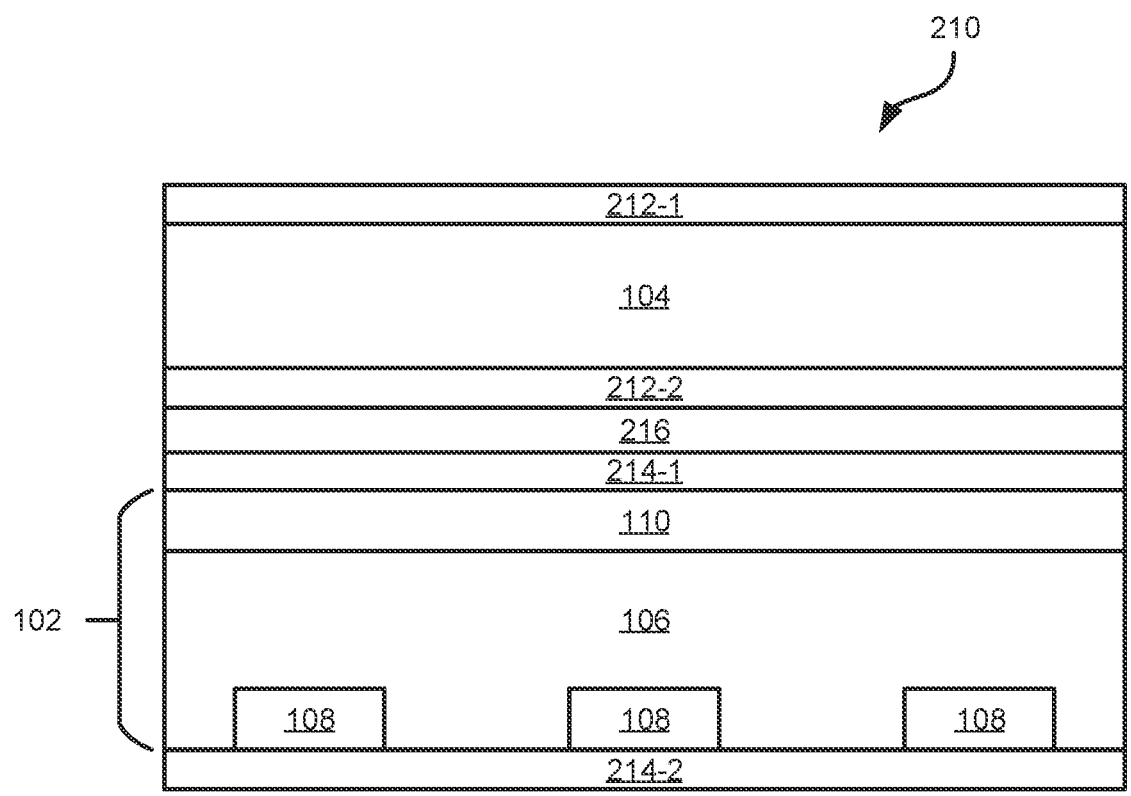
FIG. 2B is a schematic diagram of another example display with substrates enclosing the display.

FIG. 2B illustrates another example display 210, in which the display layer 104 and the antenna 102 are separately enclosed and adhered together. In particular, the display 210 includes display glass substrates 212-1 and 212-2, antenna glass substrates 214-1 and 214-2, and an adhesive 216.

The display glass substrates 212-1 and 212-2 enclose the display layer 104. In the present example, the substrate 212-1 may be at an outer side of the display layer 104 (i.e., the side of the display layer 104 closest to the viewer) and the substrate 212-2 may be at an inner side of the display layer 104 (i.e., the side of the display layer 104 furthest from the viewer and hence the side of the display layer 104 closest to the antenna 102).

The antenna glass substrates 214-1 and 214-2 enclose the antenna 102. In the present example, the substrate 214-1 may be at an outer side of the antenna 102 (i.e., the side of the antenna 102 closest to the viewer, and hence the side of the antenna 102 closest to the display layer 104) and the substrate 214-2 may be at an inner side of the antenna 102.

The display layer 104 and the antenna 102, separately enclosed by the substrates 212 and 214, respectively, may be adhered together by the adhesive 216. In particular the adhesive 216 adheres the display glass substrate 212-2 to the antenna glass substrate 214-1. The adhesive 216 may be any suitable glass adhesive, such as silicones, epoxies, acrylics, and the like.

In the examples depicted in FIGS. 2A and 2B, the substrates enclosing the display layer 104 and the antenna 102 are described as being glass substrates; in other examples, the substrates may be formed of other suitable materials.

Figure 3:
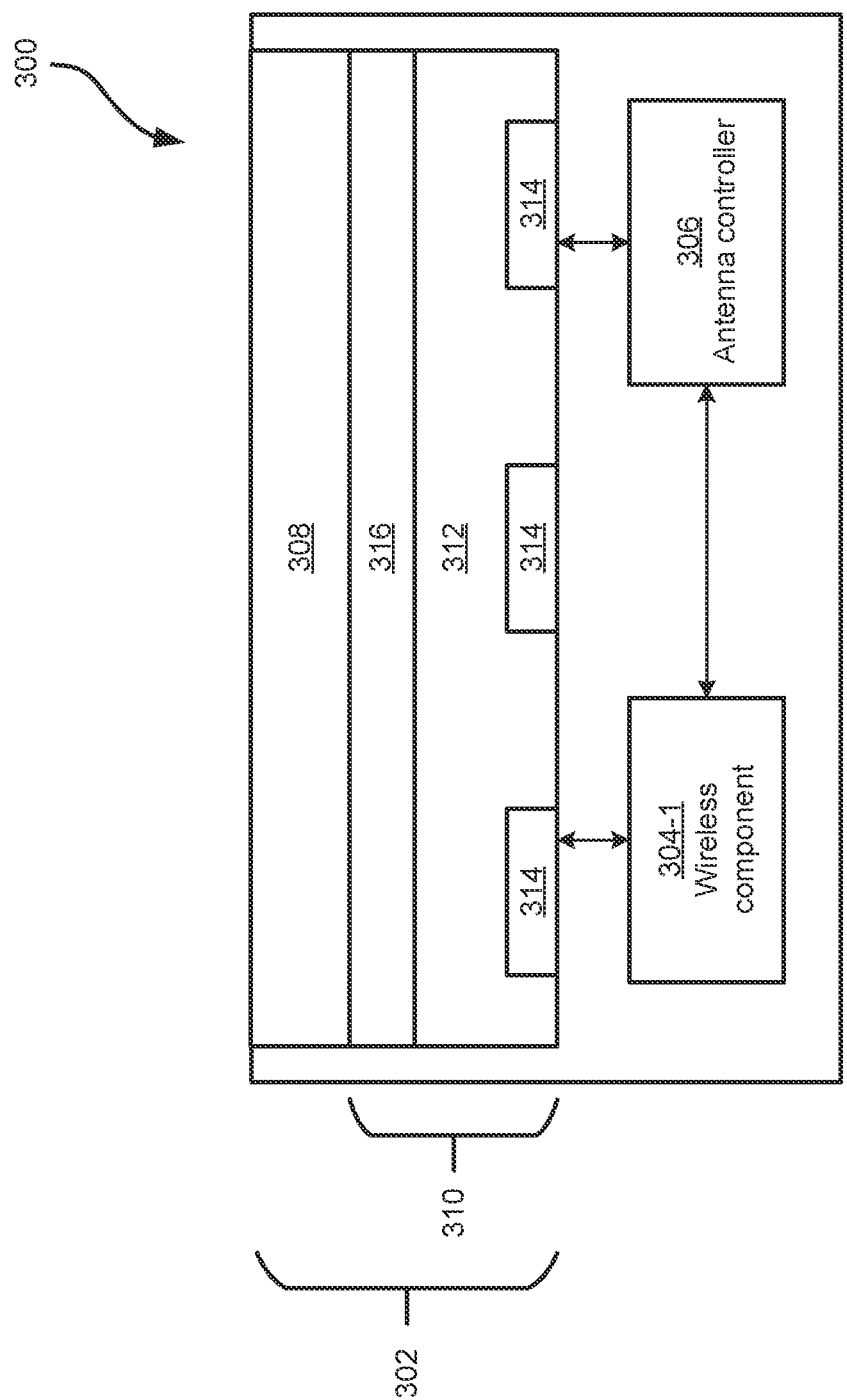
FIG. 3 is a block diagram of an example computing device having a display with a dynamic liquid crystal antenna.

FIG. 3 depicts a block diagram of an example computing device 300. The computing device 300 includes the display 302, a wireless component 304-1, and an antenna controller 306.

The display 302 may be similar to the display 100 and includes a display layer 308 and an antenna 310 having a liquid crystal layer 312, a driving electrode 314, and a common electrode 316. The display 302 may further include glass substrates enclosing the display 302, similar to the structures of the displays 200 or 210. In particular, the display layer 308 and the antenna 310 are substantially parallel to one another, such that the antenna 310 may increase a depth of the display 302 but does not increase a surface area occupied by the display 302.

Figure 4:
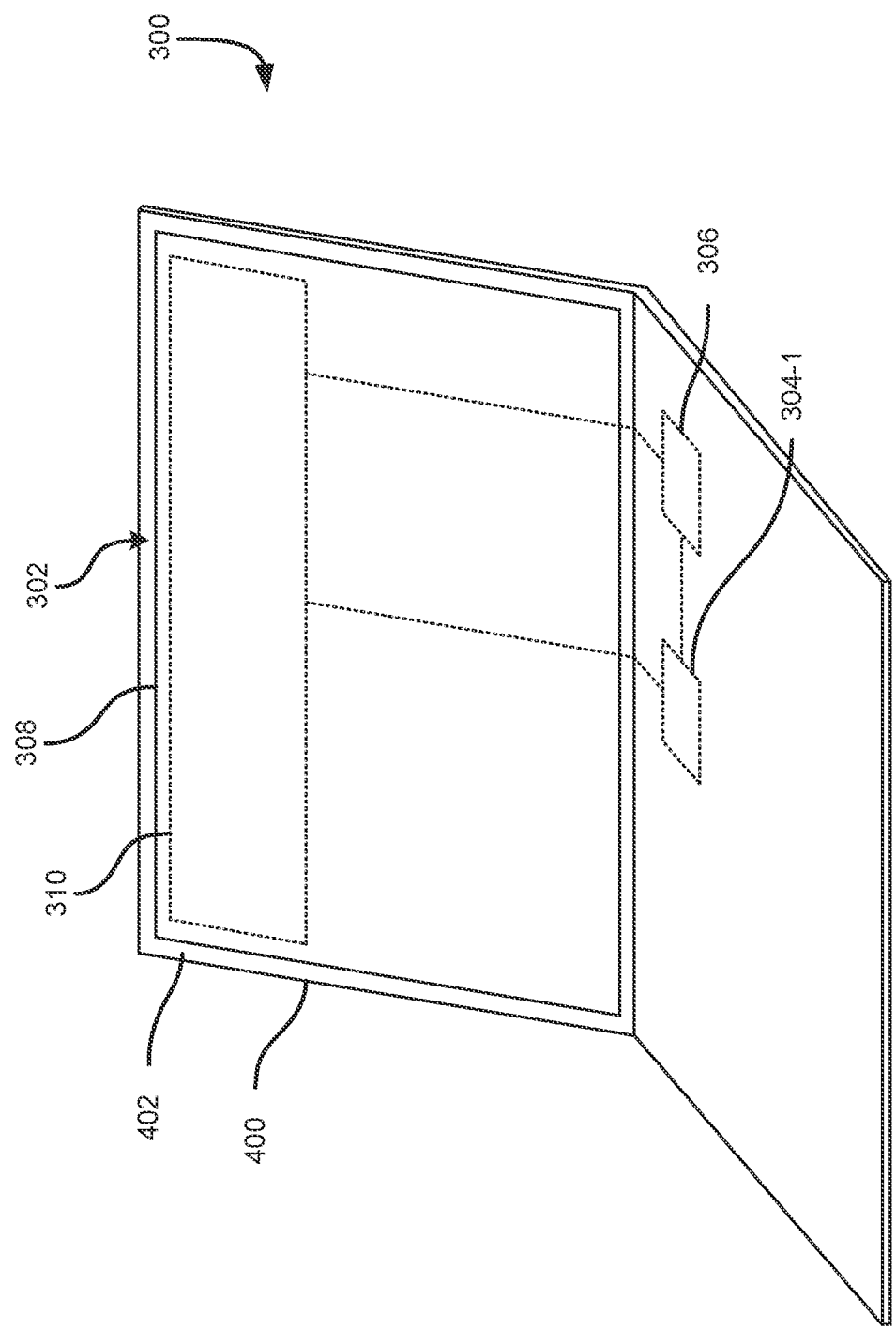
FIG. 4 is a perspective view of the example computing device of FIG. 3.

For example, as illustrated in FIG. 4, the computing device 300 be a laptop or notebook computer, and hence may include a housing 400 in which the display 302 is housed. The antenna 310 may be formed behind and substantially parallel to the display layer 308. Thus, the display 302 may occupy a greater portion of the housing 400 and the housing 400 may have a smaller bezel 402, since the bezel 402 does not house an antenna or other wireless communication structures.

In some examples, as illustrated in FIG. 4, the antenna 310 may be formed in a portion of the total area of the display layer 308. The portion of the area occupied by the antenna 310 may be selected based on the types and number of wireless components serviced by the antenna 310, for example, based on typical sizes of the corresponding antenna structures, the frequency that multiple wireless components are expected to be used simultaneously, and the like. In some examples, the antenna 310 may occupy more or less of the area of the display layer 308, including an entirety of the area of the display layer 308.

Returning to FIG. 3, the wireless component 304-1 is interconnected to the antenna 310 and enables wireless communications, such as via a wireless wide area network (WWAN) protocol, a wireless local area network (WLAN) protocol, a Bluetooth (BT) protocol, a near field communication (NFC) protocol, and the like. In particular, the wireless component 304-1 may include suitable hardware to support communications by a given communication protocol based on the signals received from the antenna 310.

In the present example, one wireless component is depicted; in other examples, the computing device 300 may include additional wireless components. In such examples, each wireless component 304 in the computing device 300 may be interconnected to the antenna 310.

Figure 5:
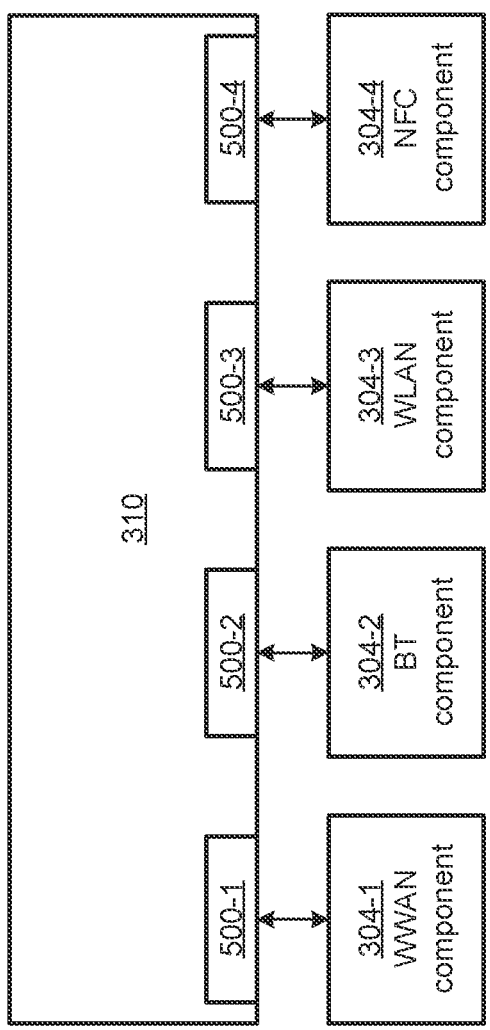
FIG. 5 is a schematic diagram of the dynamic antenna of FIG. 3 connected to multiple wireless components.

For example, referring to FIG. 5, a schematic diagram of the dynamic antenna 310 with connection points 500-1, 500-2, 500-3, and 500-4. The antenna 310 may be connected to wireless components 304-1, 304-2, 304-3, 304-4 via respective connection points 500. The dynamic antenna 310 may therefore provide suitable antenna structures to each of the wireless components 304 based on which wireless components 304 are active, as will be described further herein.

Returning again to FIG. 3, the antenna controller 306 is interconnected to the wireless component 304 and the antenna 310 and is to control the antenna 310 to selectively activate pixels of the antenna 310 to form an antenna structure for the wireless component 304. The antenna controller 306 may be a microcontroller, a microprocessor, a processing core, or similar device capable of executing instructions. The antenna controller 306 may also include or be interconnected with a non-transitory machine-readable storage medium that may be electronic, magnetic, optical, or other physical storage device that stores executable instructions allowing the antenna controller 306 to perform the functions described herein. In particular, the instructions may cause the antenna controller 306 to selectively activate pixels of the antenna 310 to form the antenna structure for the wireless component(s) 304.

Figure 6:
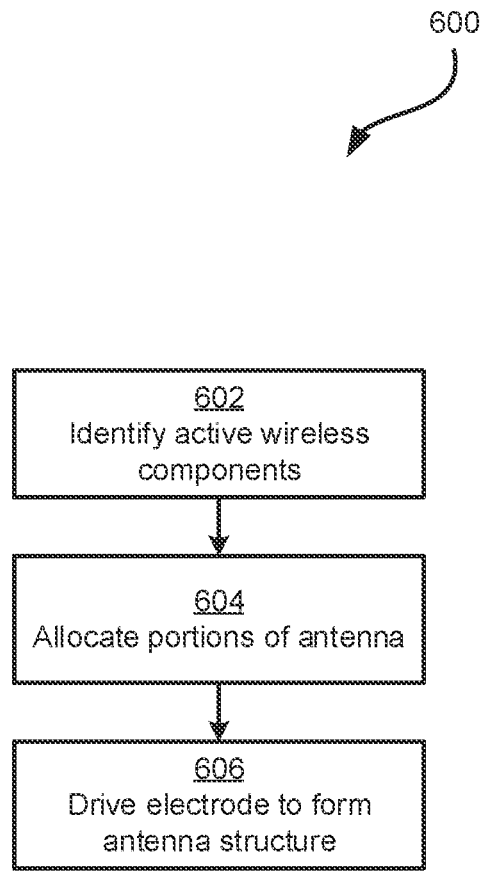
FIG. 6 is a flowchart of an example method of selectively activating a dynamic liquid crystal antenna.

For example, referring to FIG. 6, an example method 600 of selectively activating a dynamic antenna is depicted. The method 600 will be described in conjunction with its performance in the computing device 300, and in particular by the antenna controller 306, with reference to the components described in FIGS. 3 and 5. In other examples, the At block 602, the antenna controller 306 identifies a subset of the wireless components 304 which are active. The active wireless components 304 may be identified, for example, based on settings of the computing device 300 and whether a particular wireless component 304 is active.

At block 604, the antenna controller 306 allocates, for each active wireless component 304 identified at block 602, a portion of the total area of the antenna 310 to the active wireless component 304.

The portion of the area of the antenna 310 allocated to each active wireless component 304 may be selected based on the number of active wireless components 304 in the subset, as well as default values of the antenna 310. For example, if the subset contains a single active wireless component 304, then the antenna controller 306 may allocate the entirety of the area of the antenna 310 to the active wireless component.

If the subset contains more than one active wireless component 304, then the antenna controller 306 may simply evenly divide the area of the antenna 310 amongst the active wireless components 304. In other examples, the antenna controller 306 may retrieve default values associated with each active wireless component 304 and allocate the portions based on the default values.

In some examples, the default values may be target values (e.g., percentages, areas) corresponding to the given wireless component 304. The antenna controller 306 may then allocate the portions based on the ratios of the target proportions or default values. For example, the WWAN component 304-1 may have a default target value of 50% of the area of the antenna 310, while the WLAN component 304-3 may have a default target value of 25% of the antenna 310. Thus, if the WWAN component 304-1 and the WLAN component 304-3 are the only two active wireless components 304, then the antenna controller 306 may allocate ⅔ of the area to the WWAN component 304-1 and ⅓ of the area to the WLAN component 304-3 based on the ratio of 50:25. In other examples, the default target values may be areas (e.g., 100 pixels or the like) rather than percentages.

In still further examples, the default values may be fixed based on the active wireless components 304. That is, each possible combination of active wireless components 304 may have predefined and fixed proportions to allocate to each active wireless component 304. In some examples, the fixed proportions may be updated based on a most recent proportion allocated to each wireless component 304 after evaluating performance levels, as will be described further herein.

At block 606, the antenna controller 306 selectively drives the driving electrode 314 form antenna structures for the active wireless components 304. In particular, the antenna controller 306 may selectively drive the driving electrode 314 to form an antenna structure for a given active wireless component 304 in the portion of the antenna 310 allocated to the given active wireless component 304. The antenna controller 306 may selectively drive the driving electrode 314 by selectively driving pixel electrodes forming the driving electrode 314.

Figure 7A:
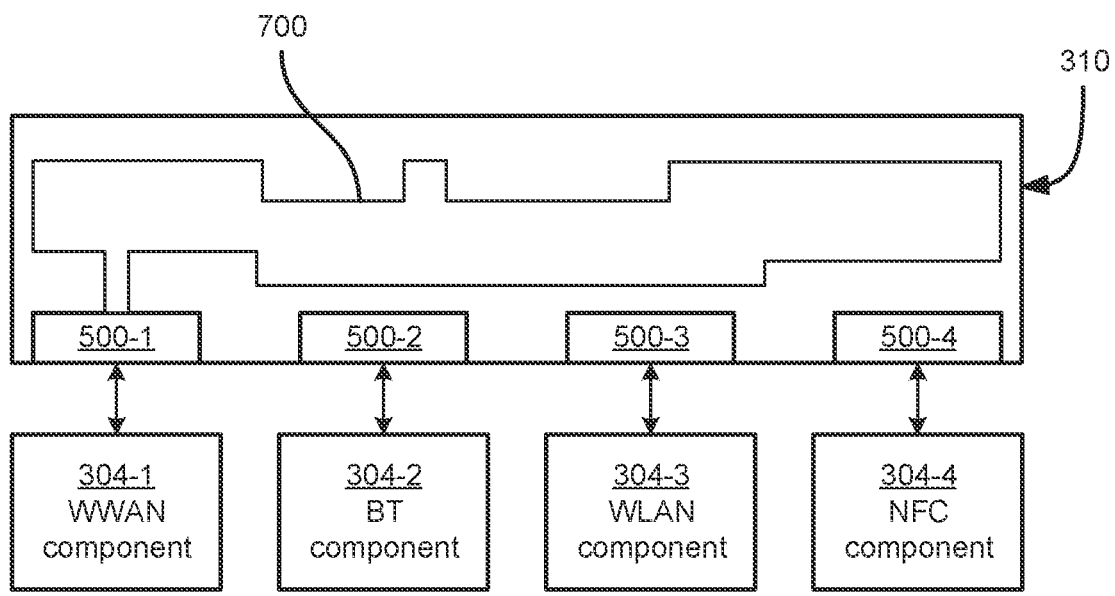
FIGS. 7A and 7B are schematic diagrams of a selectively activated dynamic antenna during the performance of the example method of FIG. 6.

For example, referring to FIG. 7A, a schematic diagram of the antenna 310 is depicted. In particular, the antenna controller 306 may identify the WWAN component 304-1 as the only active wireless component and accordingly allocate the entirety of the area of the antenna 310 to the WWAN component 304-1. The antenna controller 306 may then selectively drive pixel electrodes of the driving electrode 314 such that the activated pixels form an antenna structure 700. In particular, the antenna structure 700 may be selected based on the type of active wireless component 304 and the available area allocated to the active wireless component 304. Further, the antenna structure 700 may be connected by activated pixels to the connection point 500-1 connecting the antenna 310 to the WWAN component 304-1

Figure 7B:
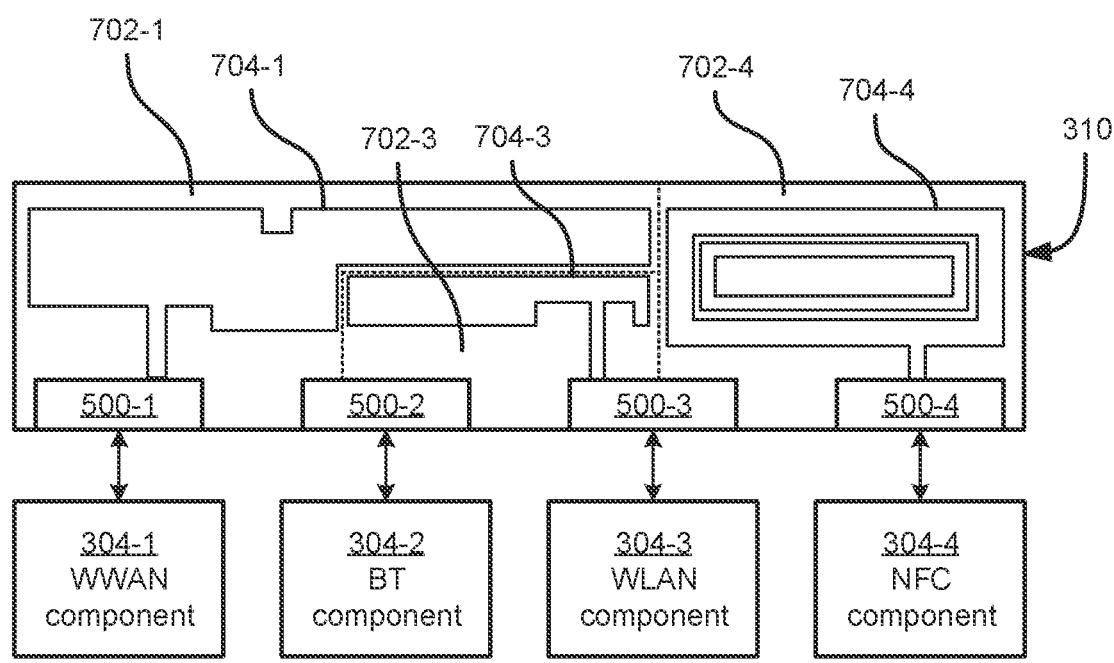

In the example depicted in FIG. 7B, the antenna controller 306 may identify the WWAN component 304-1, the WLAN component 304-3 and the NFC component 304-4 as the subset of active wireless components. Accordingly, the antenna controller 306 may allocate portions 702-1, 702-3, and 702-4 to the corresponding active wireless components 304. The antenna controller 306 may selectively drive pixel electrodes of the driving electrode 314 such that the activated pixels form an antenna structure 704-1 in the portion 702-1 allocated to the WWAN component 304-1. The antenna structure 704-1 may be selected to be suitably shaped for WWAN communications and may be connected via activated pixels to the connection point 500-1 connecting the antenna 310 to the WWAN component 304-1.

Similarly, the antenna controller 306 may selectively drive pixel electrodes of the driving electrode 314 such that the activate pixels form an antenna structure 704-3 in the portion 702-3 allocated to the WLAN component 304-3. The antenna structure 704-3 may be selected to be suitably shaped for WLAN communications and may be connected via activated pixels to the connection point 500-3 connecting the antenna 310 to the WLAN component 304-3.

Finally, the antenna controller 306 may selectively drive pixel electrodes of the driving electrode 314 such that the activate pixels form an antenna structure 704-4 in the portion 702-4 allocated to the NFC component 304-4. The antenna structure 704-4 may be selected to be suitably shaped for NFC communications and may be connected via activated pixels to the connection point 500-4 connecting the antenna 310 to the NFC component 304-4.

Figure 8:
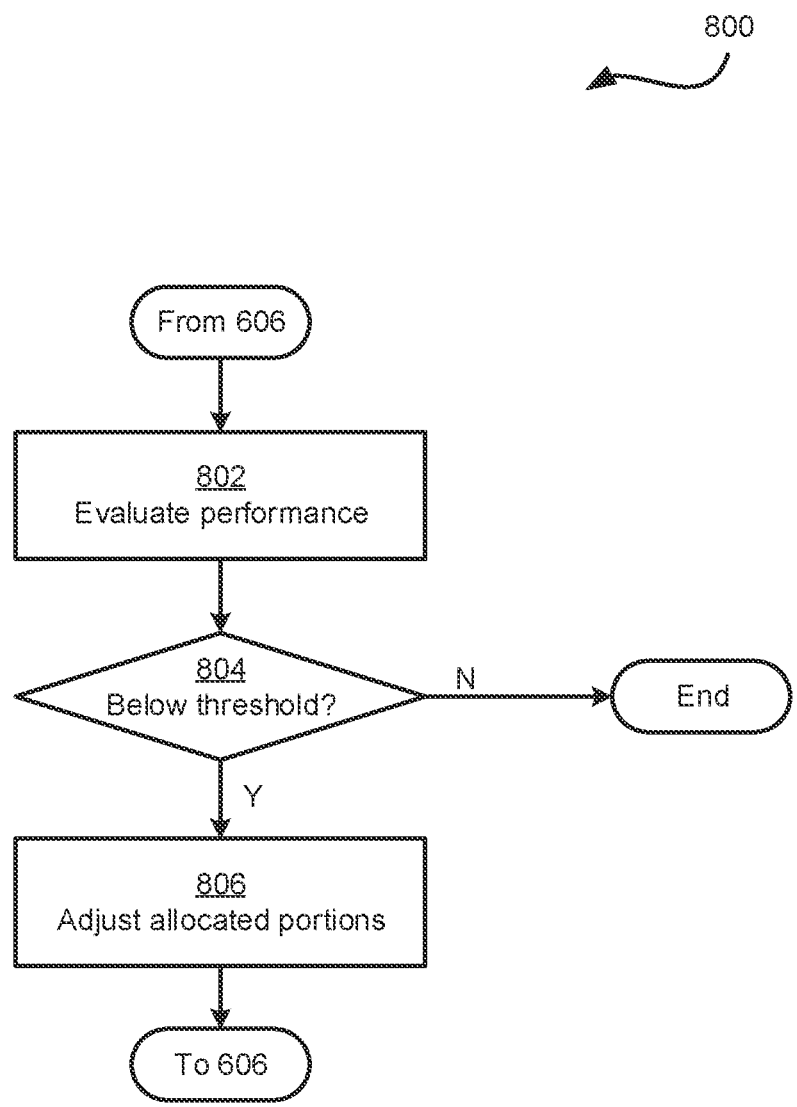
FIG. 8 is a flowchart of an example method of adjusting a dynamic antenna based on performance level.

FIG. 8 depicts an example method 800 of adjusting a dynamic antenna based on performance. The method 800 may be performed, for example, after block 606 of the method 600.

At block 802, the antenna controller 306 evaluates respective performance levels of the active wireless components 304. For example, the performance level may be based on a number of factors used to evaluate wireless communications, such as latency, jitter, and the like.

At block 804, the antenna controller 306 determines whether any of the respective performance levels are below a threshold performance level. In some examples, the threshold performance level may be a predefined value, while in other examples, the threshold performance level may be dynamically selected based on the active wireless components 304. For example, the threshold performance level may be based on an average performance level of each of the active wireless components 304. That is, at block 804, the antenna controller 306 may determine whether the performance levels of the active wireless components 304 are approximately balanced.

In still further examples, the threshold performance level may be based on user input. For example, a user of the computing device 300 may indicate that performance of the NFC component 304-4 is to be prioritized. Accordingly, the antenna controller 306 may dynamically set the threshold performance levels to ensure that the performance level of the NFC component 304-4 has the highest performance level.

If the determination at block 804 is negative, that is, no performance levels are below a threshold and/or all the performance levels of the active wireless components 304 are approximately balanced, then the method 800 ends.

If the determination at block 804 is affirmative, that is, a performance level of at least one of the active wireless components 304 is below the threshold, then the method 800 proceeds to block 806. At block 806, the antenna controller 306 adjusts the allocated to each active wireless component 304 based on the respective performance levels. For example, the antenna controller 306 may increase the portion of the antenna 310 allocated to active wireless components 304 having lower performance levels, or performance levels below the threshold. As a result of increasing some portions, portions allocated to other active wireless components 304 may decrease.

The method 800 may then return to block 606 to selectively drive the driving electrode 314 form antenna structures for the active wireless components 304 within the adjusted allocated portions. The method 800 may be repeated to tune the performance levels of each of the active wireless components 304 until they are balanced to each other, or to user-defined priorities.

As described above, an example display includes a display layer, and a dynamic liquid crystal antenna parallel to the display layer. The dynamic antenna includes a pixelated driving electrode to selectively activate pixels of the dynamic antenna, enabling dynamic formation of antenna structures based on the active wireless components in the computing device. The dynamic antenna further includes a common electrode extending between the liquid crystal layer of the antenna and the display layer to isolate the electromagnetic waves from the driving electrode from affecting the display layer.

The scope of the claims should not be limited by the above examples but should be given the broadest interpretation consistent with the description as a whole.

The invention claimed is:

1. A display for a computing device, the display comprising:
   a display layer;
   a dynamic liquid crystal antenna formed substantially parallel to the display layer, the dynamic liquid crystal antenna comprising:
      a liquid crystal layer;
      a pixelated driving electrode to selectively activate pixels of the liquid crystal layer to form an antenna structure; and
      a common electrode extending between the liquid crystal layer and the display layer to isolate the liquid crystal layer from the display layer.

2. The display of claim 1, further comprising a controller for the dynamic liquid crystal antenna, the controller to selectively drive the pixelated driving electrode based on a set of active wireless components.

3. The display of claim 1, wherein the pixelated driving electrode comprises a plurality of pixel electrodes, wherein each pixel electrode is to locally activate the liquid crystal layer to form a pixel of the liquid crystal layer.

4. The display of claim 1, further comprising:
   an outer glass substrate to enclose the display layer at an outer side of the display;
   an inner glass substrate to enclose the dynamic liquid crystal antenna at an inner side of the display; and
   a middle glass substrate disposed between the display layer and the dynamic liquid crystal antenna to enclose and separate the display layer and the dynamic liquid crystal antenna.

5. The display of claim 1, further comprising:
   display glass substrates to enclose the display layer;
   antenna glass substrates to enclose the dynamic liquid crystal antenna; and
   an adhesive to adhere the display layer to the dynamic liquid crystal antenna.

6. A computing device comprising:
   a wireless component to enable wireless communications;
   a display comprising:
      a display layer;
      a dynamic liquid crystal antenna formed substantially parallel to the display layer, the dynamic liquid crystal antenna comprising:
         a liquid crystal layer;
         a pixelated driving electrode to selectively activate pixels of the liquid crystal layer; and
         a common electrode extending between the liquid crystal layer and the display layer to isolate the liquid crystal layer from the display layer; and
   an antenna controller interconnected with the wireless component and the dynamic liquid crystal antenna, the antenna controller to selectively drive the driving electrode to activate pixels of the liquid crystal layer to form an antenna structure for the wireless component.

7. The computing device of claim 6, wherein the dynamic antenna is formed in a portion of a total area of the display layer.

8. The computing device of claim 6, further comprising additional wireless components; and
   wherein the antenna controller is to:
      identify a subset of active wireless components;
      allocate a portion of the dynamic antenna to each active wireless components; and
      selectively drive the driving electrode to activate pixels of the liquid crystal layer to form a respective antenna structure for each wireless components in the respective allocated portion.

9. The computing device of claim 8, wherein the dynamic antenna further comprises a connection point for each wireless component.

10. The computing device of claim 9, wherein the respective antenna structure of each active wireless component is connected to the respective connection point via activated pixels of the dynamic antenna.

* * * * *